United States Patent
Eglin

(10) Patent No.: US 8,568,096 B2
(45) Date of Patent: Oct. 29, 2013

(54) DRIVE CONTROL AND REGULATION METHOD AND SYSTEM FOR A HYBRID HELICOPTER

(75) Inventor: Paul Eglin, Aix en Provence (FR)

(73) Assignee: Eurocopter, Marignane Cedex (FR)

( * ) Notice: Subject to any disclaimer, the term of this patent is extended or adjusted under 35 U.S.C. 154(b) by 754 days.

(21) Appl. No.: 12/769,912

(22) Filed: Apr. 29, 2010

(65) Prior Publication Data

US 2010/0310371 A1    Dec. 9, 2010

(30) Foreign Application Priority Data

Jun. 4, 2009  (FR) ...................................... 09 02684

(51) Int. Cl.
*B64C 27/00* (2006.01)

(52) U.S. Cl.
USPC ........ 416/1; 416/31; 416/36; 416/43; 416/44; 416/46; 416/49; 416/69; 416/70 R

(58) Field of Classification Search
USPC .......... 416/1, 31, 36, 43, 44, 46, 49, 69, 70 R
See application file for complete search history.

(56) References Cited

U.S. PATENT DOCUMENTS

| | | |
|---|---|---|
| 4,488,851 A | 12/1984 | Young |
| 4,514,142 A | 4/1985 | Young |
| 2002/0011539 A1* | 1/2002 | Carter, Jr. .......................... 244/6 |
| 2007/0170307 A1* | 7/2007 | de la Cierva Hoces ....... 244/7 R |
| 2008/0237392 A1 | 10/2008 | Piasecki et al. |
| 2008/0294305 A1 | 11/2008 | Roesch |
| 2009/0159740 A1* | 6/2009 | Brody et al. ............... 244/17.21 |

FOREIGN PATENT DOCUMENTS

FR    2 916 421    11/2008

OTHER PUBLICATIONS

French Search Report dated Feb. 10, 2010 from corresponding French application.

\* cited by examiner

*Primary Examiner* — Igor Kershteyn
(74) *Attorney, Agent, or Firm* — Brooks Kushman P.C.

(57) ABSTRACT

The present invention relates to a control and regulation method for a rotorcraft having at least one variable-pitch propulsive propeller driven by at least one power source, said method consisting in generating at least one mean pitch setpoint $\beta tcl^*$ for the propeller(s) as a function of a thrust variation control order Tcl, wherein the method consists in defining a plurality of operating modes, including:
  a direct mode in which the value of the mean pitch value is a direct result of the control order Tcl;
  a forced mode in which the mean pitch is automatically forced to a calculated pitch value;
  a regulated mode in which the power of the propulsive propeller(s) is regulated as a function of a power setpoint from a pilot and of servo-controlling the mean pitch of the propeller(s); and
  a protected mode.

27 Claims, 6 Drawing Sheets

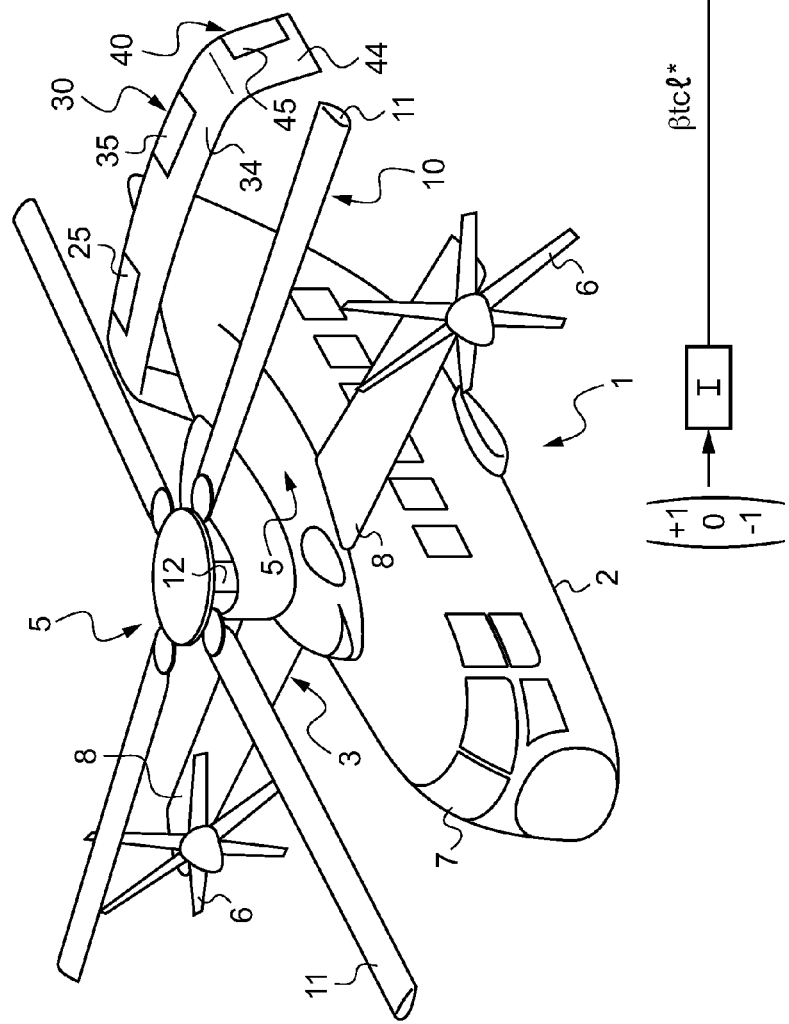
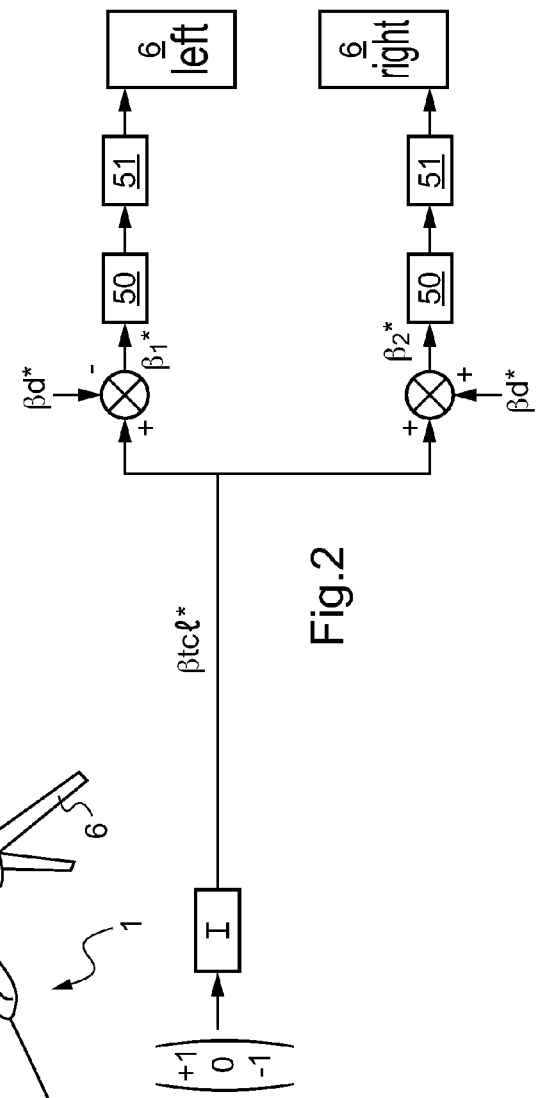

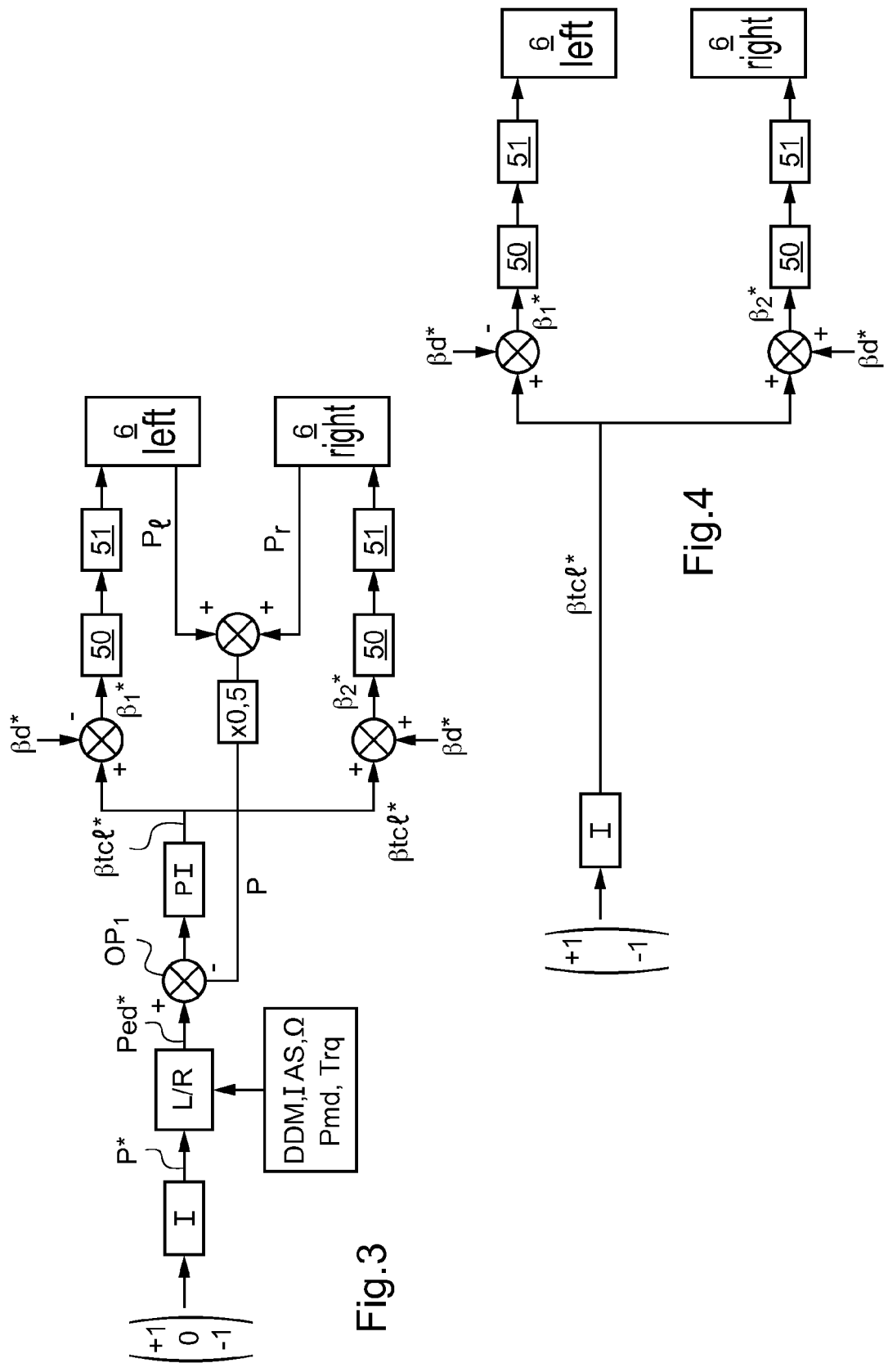

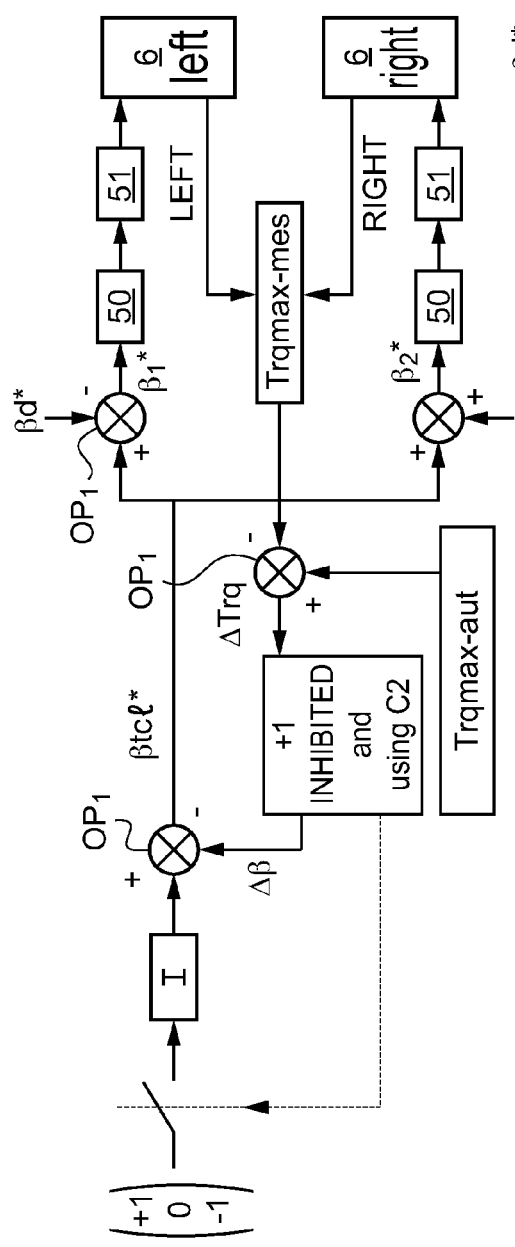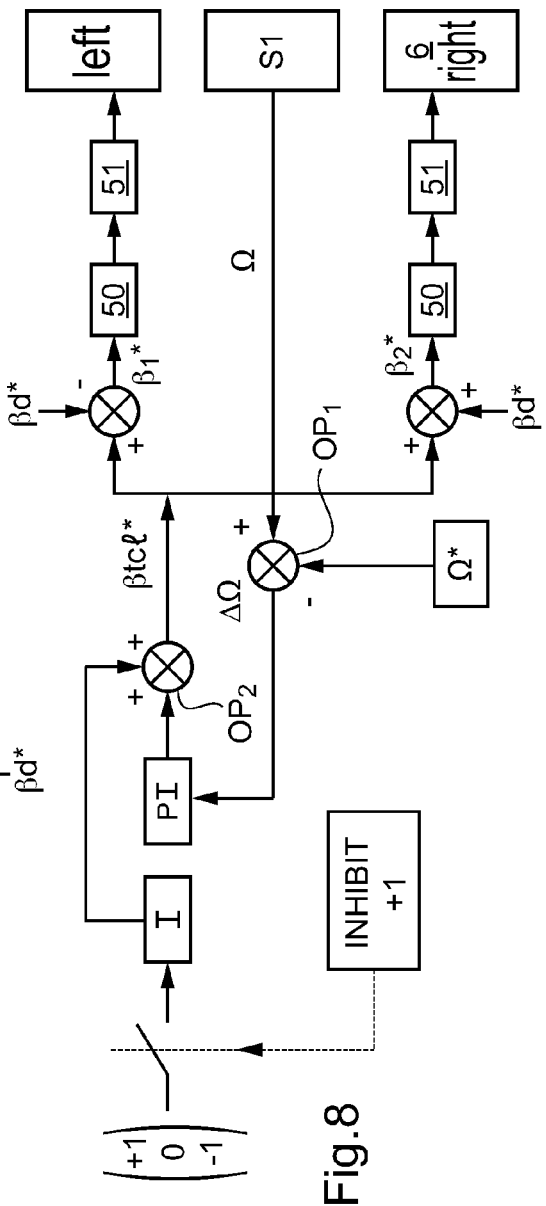
Fig.7
Fig.8

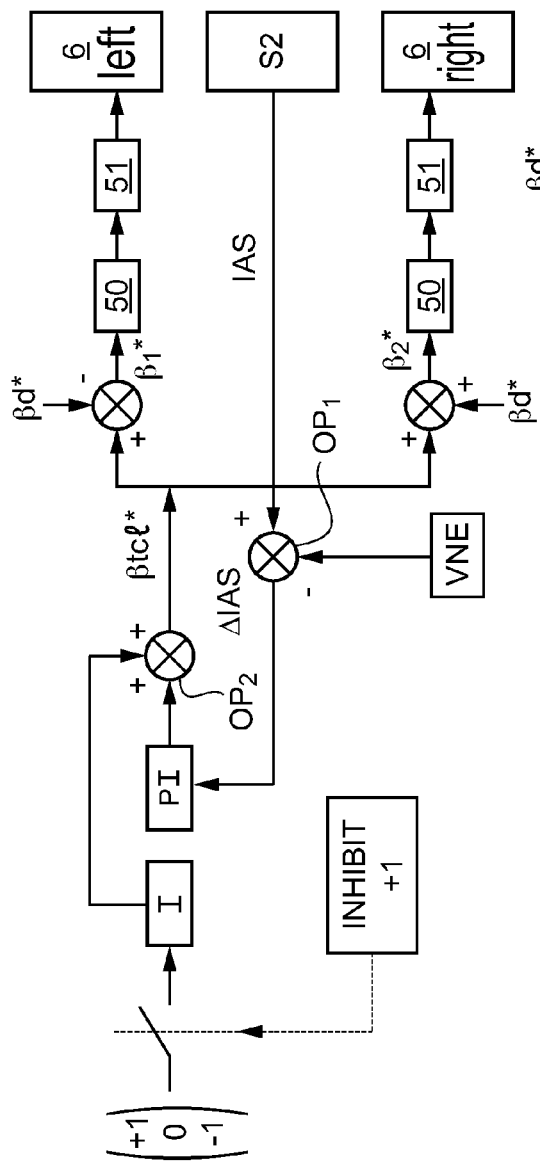
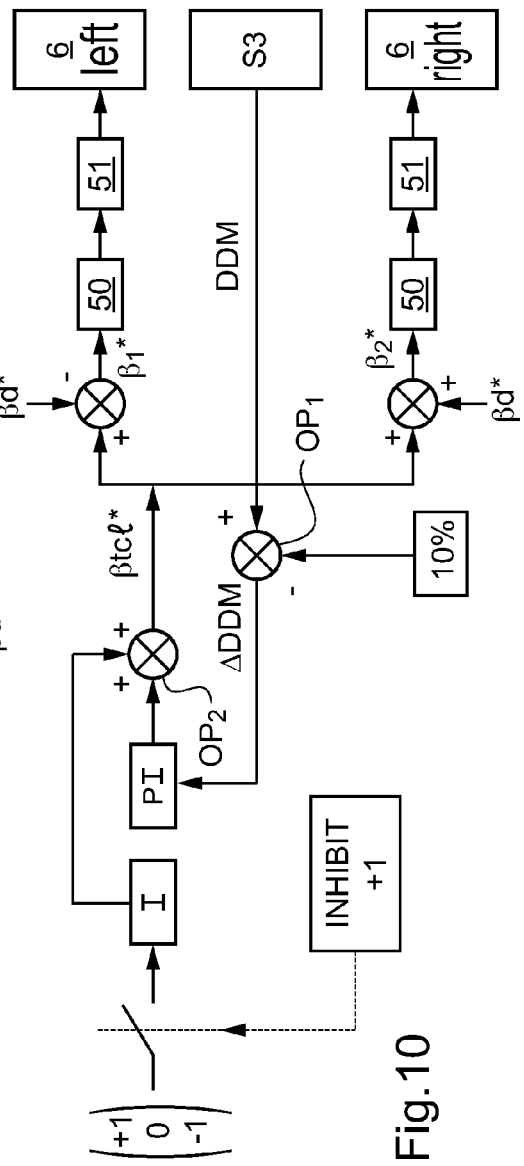
Fig.9
Fig.10

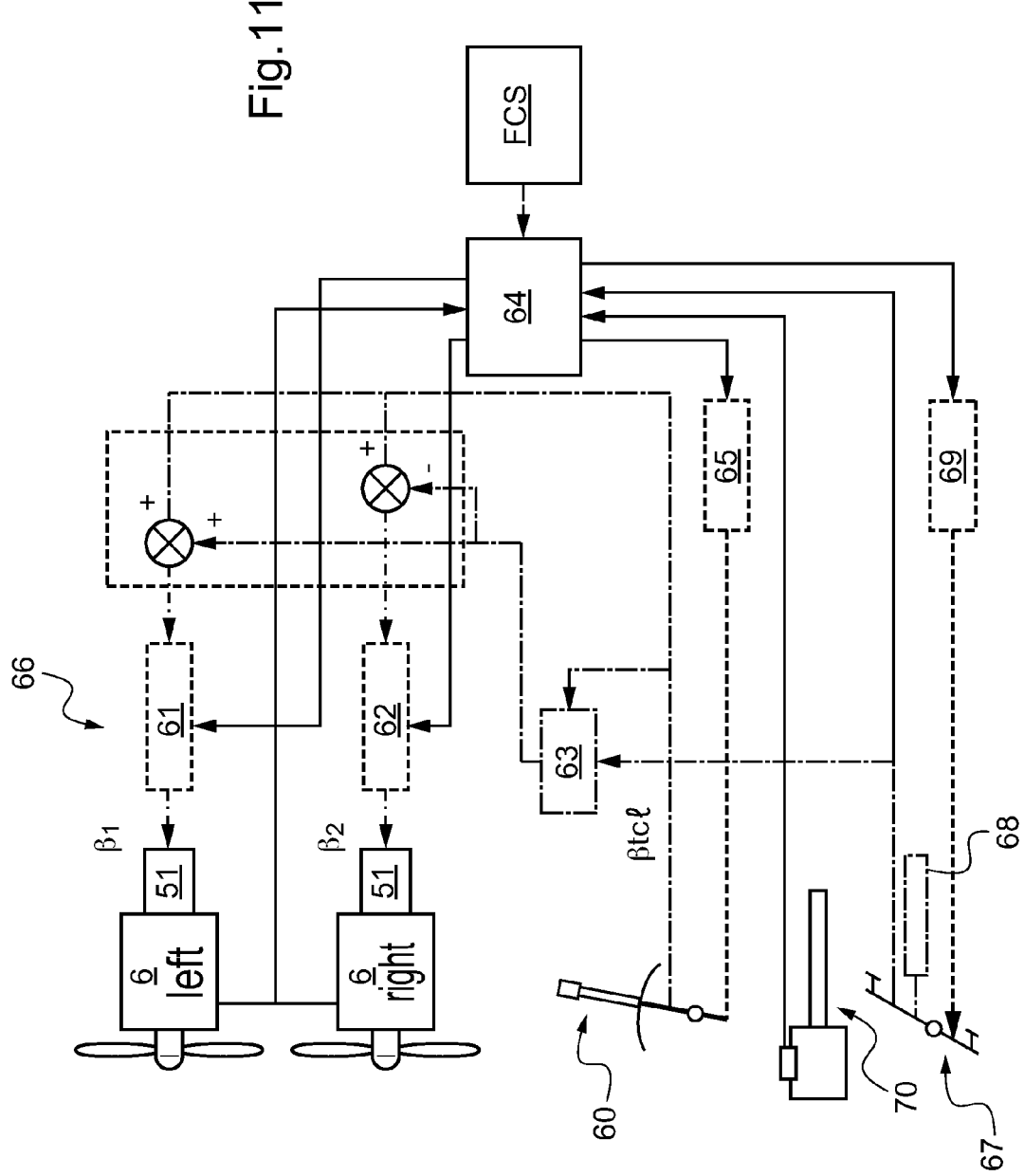

DRIVE CONTROL AND REGULATION METHOD AND SYSTEM FOR A HYBRID HELICOPTER

FIELD OF THE INVENTION

The present invention relates to the general technical field of automatic or semiautomatic flight control systems, and more particularly to a semiautomatic channel or chain for controlling the pitch of propulsive propellers laterally on the left and on the right of a particular kind of rotorcraft, namely a hybrid helicopter.

The present invention relates to a rotorcraft and to its control system, i.e. to regulating or controlling the drive members of the rotorcraft.

BACKGROUND OF THE INVENTION

The term "rotorcraft" is used to designate an aircraft in which lift is provided in full or in part by one or more propellers of substantially vertical axis and of large diameter, commonly known as rotors or as rotary wings.

In the category of rotorcraft, various distinct types are known, however, in addition to a main rotor, a hybrid helicopter in accordance with the invention has at least one propulsive propeller, and preferably two variable-pitch propulsive propellers forming parts of two propulsion units on the left and on the right of the hybrid helicopter.

A conventional helicopter has at least one main rotor that, under drive from a suitable power plant, serves both to provide it with lift and with propulsion. A helicopter is capable of hovering, i.e. remaining at a stationary point in three dimensions, it can take off and land vertically, and it can move in any direction (forwards-rearwards-sideways-up-down).

The driving power of a conventional helicopter (not having any propulsive propellers) is generally regulated by means of a control member/module that adapts the power delivered by the power plant to the power required by the dynamic assemblies (rotor(s) and accessories), so as to maintain the speed of rotation of the main rotor(s) and of the power transmission system at its setpoint value.

In an aircraft that is propelled by one or more variable-pitch propellers, power regulation generally includes a regulation member/module (in general of the hydromechanical type) that adapts the pitch of the propulsive propeller(s) so as to consume all of the available power that results from how the pilot has set a throttle (or thrust) control member or lever.

Those two adjustments cannot be juxtaposed for regulating the power of rotorcraft fitted with one or more propulsive propellers, since those modes of regulation are antagonistic. The member for adapting power when regulating a helicopter in conventional manner opposes any transient variation in the speed of the power transmission system of the kind that results from varying thrust from the or each propeller.

Furthermore, for a rotorcraft fitted with one or more propulsive propellers, regulating the propulsive propeller(s) by the pilot directly controlling propulsive propeller pitch variations could give rise to damage thereto, as a result of sudden changes in the engine torque transmitted to the propeller(s).

For example, documents U.S. Pat. No. 4,488,851 and U.S. Pat. No. 4,514,142 disclose a helicopter having a main lift rotor and also having a propulsive tail rotor. A control system enables the pilot to limit the power consumed by the propulsive tail rotor to the advantage of the power required by the main lift rotor. Such control carried out by a pilot does not make piloting operations any easier.

Document FR 2 916 421 discloses a control system for a rotorcraft having a rotor, at least one variable-pitch propulsive propeller, and an engine driving the rotor and the propeller. The system includes a member for generating a propeller pitch setpoint as a function of a thrust variation control order, a member for generating a drive speed setpoint for the rotor and for the propeller as a function of the travel speed of the rotorcraft, and a member for generating an engine speed setpoint as a function of the thrust variation control order, of the drive speed setpoint, and of a collective pitch control order for the rotor.

In a hybrid helicopter having variable-pitch propellers, the pilot must both limit upward variation of the collective pitch and consequently power transmission to the rotor(s) from the power plant via the transmission members so as to avoid exceeding mechanical or thermal limits of those elements, and also, and for the same reasons, limit the propeller thrust control, i.e. the propeller pitch control, as explained below.

Furthermore, since the power plant of a hybrid helicopter is constituted by one or more turbine engines, the speeds of rotation at the outlet(s) from the turbine engine(s), of the propeller(s), of the rotor(s), and of the mechanical interconnection system are mutually proportional, with the proportionality ratio being constant regardless of the flight configuration of the hybrid helicopter under normal conditions of operation of the integrated drive train.

It can thus be understood that if the hybrid helicopter is fitted with only one turbine engine, it is that engine that drives the rotor(s) and the propeller(s) via the mechanical interconnection system. However, if the helicopter is fitted with two or more turbine engines, then the rotor(s) and the propeller(s) are driven in rotation by said turbine engines via the interconnection mechanical system.

In other words, the drive train operates without any variable ratio between the speeds of rotation of the turbine engine(s), the propeller(s), the rotor(s), and the mechanical interconnection system.

Consequently, the rotor(s) advantageously continue(s) to be driven in rotation by the turbine engine(s), and continue(s) to develop lift whatever the configuration of the aircraft.

More precisely, the rotor(s) is/are of the kind designed to provide all of the lift of the hybrid helicopter during stages of taking off, landing, and hovering, and some of the lift during cruising flight, with an auxiliary wing then contributing a portion of the lift for supporting said hybrid helicopter.

Thus, the rotor(s) deliver(s) only part of the lift for the hybrid helicopter in cruising flight and possibly also a small contribution to propulsive or traction forces (in a helicopter), but no contribution to drag (in an autogyro). These operating conditions thus lead to a reduction in the delivery of power that is dedicated to traction provided by the rotor(s). A small contribution to propulsive forces is provided by the rotor(s) being tilted towards the front of the aircraft by a small amount only. That degrades the fineness of the rotor(s) very little and is consequently more advantageous in terms of power balance than a demand for additional thrust exerted by the propeller(s).

Advantageously, the wing is made up of two half-wings, each half-wing being on a respective side of the fuselage. The half-wings may together form a high wing in which case they preferably present a negative dihedral angle. Nevertheless, they could equally well be constituted by a low wing in which case they would preferably have a positive dihedral angle, or indeed an intermediate wing of arbitrary dihedral angle. The shape of the half-wings in plan view could correspond to half-wings that are rectangular, tapering, or back-swept, etc.

Thus, by controlling the thrust from or the mean pitch (also known as the half-sum pitch) of the propulsive propellers, the pilot might accidentally give rise to a drop in the speed of the main rotor(s), might exceed the velocity never exceeded VNE (maximum authorized air speed), or might exceed mechanical strength limits, or might exceed thermal limits of the propulsive unit(s), of the turbine engine(s), or of the propeller(s).

OBJECT AND SUMMARY OF THE INVENTION

The object of the present invention is to propose a novel method of controlling and regulating the pitch of the propulsive propeller(s) of a rotorcraft constituting a hybrid helicopter.

Consequently, the object of the present invention is to propose a novel control and regulation system for the pitch of the propulsive propellers of a hybrid helicopter, enabling the aircraft to be protected from an untimely control from the pilot or from a pitch control that is voluntary but excessive.

In addition, in the event of losing speed, e.g. by taking a nose-up trim, the aerodynamic angle of attack of the blades of the propellers increases unless the pilot reduces their pitch. Assuming that such an increase in angle of attack occurs, then the power consumed by the propellers will increase and that might exceed the capacity of the engines.

Consequently, an object of the present invention is to propose a novel control and regulation system for hybrid helicopter propeller pitch that enables the aircraft to be protected by adjusting the propeller pitch to the travel speed of the aircraft so as to avoid any divergence of the power required by the propellers, i.e. so as to avoid the propellers ever drawing power that exceeds the capacity of the engines and/or the transmission.

Clearly the present invention relates to aircraft having one or more propulsive propellers.

Various physical parameters are mentioned below, including Trqmax_aut which is the maximum torque authorized for the transmission system, PP1max which is the maximum value of the present powers of the left and right propellers, Ptot which is the total power consumed by the propulsive propellers, Pmd which is the maximum power available from the engine(s) for the propulsive propeller(s) (i.e. the maximum power available from the engine(s) minus the power being consumed by the main rotor, the accessories, and transmission losses), IAS which is indicated air speed, VNE which is the velocity never exceeded i.e. the maximum authorized air speed, $\Omega$ which is the speed of rotation of the propulsive propellers, and $\Omega^*$ which is the speed of rotation setpoint for said propellers, and DDM which is the dive deflection margin of the longitudinal cyclic control as a percentage of its total deflection.

The objects given to the invention are achieved by a control and regulation method for a rotorcraft having at least one main lift rotor, at least one variable-pitch propulsive propeller, and at least one power source for driving the main rotor(s) and at least one propeller, said method consisting in generating at least one mean pitch setpoint $\beta tcl^*$ for the propeller(s) as a function of thrust variation control order Tcl and as a function of the power consumed by the propeller(s), wherein the method consists in defining a plurality of operating modes, including the following:

a direct mode, in which the value of the mean pitch results directly from the thrust variation control order Tcl;
a forced mode, in the event of the main rotor(s) also rotating, in which the mean pitch is forced automatically under control of the pilot to a calculated pitch value;
a regulated mode, in which the power consumed by the propeller(s) is regulated as a function of a power setpoint from a thrust variation control Tcl; and
a protected mode that is activated when operating in the various other operating modes other than forced mode, in the event of at least one of various limiting physical parameters reaching or exceeding its corresponding limit, and in which the mean pitch setpoint $\beta tcl^*$ is reduced automatically.

In an implementation in accordance with the invention, the method consists in activating protected mode when at least one of the following conditions concerning the limiting physical parameters IAS, DDM, $\Omega$, PP1max, Ptot, is satisfied:

IAS≥VNE;

DDM≤10%;

$\Omega-\Omega^*$<−0.6 radians per second (rad/s);

PP1max>(Trqmax_aut×$\Omega$); and

Ptot>Pmd;

where Trqmax_aut is the maximum torque that can be accepted by the transmission system, PP1max is the current maximum value of the powers of the right and left propellers, Ptot is the total power consumed by the propulsive propellers, Pmd is the maximum power available from the engine for the propulsive propellers, IAS is the indicated air speed, VNE is the velocity never exceeded, $\Omega$ is the speed of rotation of the propulsive propellers, $\Omega^*$ is the setpoint speed of rotation for said propellers, and DDM is the current dive deflection margin of the longitudinal cyclic control expressed as a percentage of its total deflection amplitude.

$\Omega^*$ may be considered as being a constant for conventional helicopters or for aircraft in accordance with the invention. Nevertheless, there exist known methods for calculating and/or determining the speed of rotation setpoint for propulsive propellers. In certain applications, at constant aircraft speed, $\Omega^*$ varies as a function of atmospheric conditions such as altitude and temperature.

In a variant of the method in accordance with the invention, once protected mode has been engaged or activated, it takes the place of the initial operating mode, e.g. regulated mode or direct mode, until good operating conditions have been reestablished.

In an implementation in accordance with the invention, forced mode is engaged on pilot override control.

In the forced mode of the method in accordance with the invention, the value of the mean pitch $\beta tcl$ is such that:

$$\beta tcl = \beta_0 + \arctan\left(\frac{TAS}{0.75R \cdot \Omega}\right) + I(Tcl)^{-5,+5}$$

where $\beta_0$ is a constant, R is the radius of the propellers, $\Omega$ is the speed of rotation of the propellers, TAS is the true air speed of the aircraft, and $I(Tcl)^{-5,+5}$ is the integral of the function Beep(Tcl) having the value −1, 0, or +1, peak-limited at −5° and at +5°, indicating that it is possible for the pilot to modify the mean pitch by acting on the thrust variation control Tcl with a pitch value lying in the range +5° and −5°.

In a first variant implementation of the method in accordance with the invention, at least certain operating modes and the conditions under which they are engaged or activated are defined as set out below.

In an implementation of the method in accordance with the invention, the direct mode is engaged automatically when the mean pitch βtcl of the propeller(s) is less than a first value βtcl1 or when the power consumed by the propeller(s) is less than a second value Pthr1.

In an implementation of the method in accordance with the invention, the regulated mode is engaged automatically when firstly the mean pitch βtcl is greater than a third value βtcl2 and secondly the power P consumed by the propeller(s) is greater than a fourth value Pthr2.

By way of example, the method in accordance with the invention consists, in the protected mode, in using a limit/regulation function on the power setpoint P* together with a proportional/integral correction PI on (P*−P) or (Ped*−P) to determine the mean pitch setpoint βtcl*, in regulated mode, using a determined algorithm, where P is the power consumed by the propeller(s) and Ped* is the same setpoint after being decremented or decreased.

In an implementation of the method in accordance with the invention, the algorithm consists in the following:
if the thrust instruction for the propeller(s) at the output from the integrator I is greater than the value:

$$\frac{\Omega}{\Omega^*} \times Pmd$$

then the power setpoint P* is limited to said value, where Pmd is the maximum available power from the engine for the propulsive propellers, Ω and Ω* being respectively the speed of rotation of the propeller(s) and the corresponding setpoint;
if the current dive deflection margin DDM for the longitudinal cyclic control expressed as a percentage of its total deflection amplitude is less than 10%, then the power setpoint P* is decremented by the value:

(DDM−10%)×PPgradddm+PPiddm×∫(DDM−10%)dt

PPgradddm and PPiddm being constants;
if the indicated air speed IAS is greater than the velocity never exceeded VNE, then the power setpoint P* is decremented by the value:

(IAS−VNE)×PPgradias+PPiias×∫(LAS−VNE)dt

PPgradias and PPiias being constants;
if the maximum value of the current powers of the right and left propeller(s) PP1max is greater than the value (Trqmax_aut×Ω), then the power setpoint P* is decremented by the value:

PP1max−(Trqmax_aut×Ω)

where Trqmax_aut is a constant relating to maximum torque; and
if the value of Ω−Ω* is less than −0.6 rad/s, the power setpoint P* is decremented by the value:

PPgradΩ×(Ω−Ω*)+PPiΩ×∫(Ω−Ω*)dt

PPgradΩ and PPiΩ being constants.

In the context of a second variant implementation of the method in accordance with the invention, certain operating modes and the conditions under which they are engaged or activated are defined as set out below.

In an implementation in accordance with the invention, the method consists in defining a constant pitch mode in which the mean pitch of the propulsive propeller(s) is constant.

In an implementation of the method in accordance with the invention, the constant pitch mode is engaged when P≤Pthr while simultaneously the 0 state from the three states −1, 0, +1 of the pulsed thrust variation control Tcl is active, P being the current power at the propellers, and Pthr being a constant selected by analyzing the polars of the propulsive propellers.

In an implementation of the method in accordance with the invention, the direct mode is engaged when the thrust variation control order Tcl is obtained by using a pulse control having three states −1, 0, +1, i.e. the function Beep(Tcl), by actuating the +1 or the −1 state.

In an implementation of the method in accordance with the invention, the regulated mode is engaged when P>Pthr at the same time as an absence of any thrust variation control order Tcl, by activating the 0 state of the pulse control having three states −1, 0, +1, where P with the current power at the propeller(s) and Pthr is a constant selected by analyzing the polars of the propulsive propellers.

In an implementation of the method in accordance with the invention, the method consists in the protected mode in using at least one loop for monitoring a limiting physical parameter, in verifying whether the limit associated with said parameter has been reached or exceeded, and if so maintaining activation of protected mode.

In an implementation in accordance with the invention, the method consists in selecting, in the following priority order 1 to 5, the limiting physical parameter for which the corresponding limit is reached or exceeded and for which the monitoring loop is activated, i.e.:
1) the speed of rotation Ω of the propeller(s);
2) the engine power Pmd available for the propellers;
3) the transmission torque Trq;
4) the current dive deflection margin DDM of the longitudinal cyclic control expressed as a percentage of its total deflection amplitude; and
5) the indicated air speed IAS.

In an implementation of the method in accordance with the invention, the protected mode consists in using at least one flight parameter relating to the available power margin ΔP or to the available torque margin ΔTrq in order to peak-limit or diminish the control order if ΔP<0 or if ΔTrq<0, thereby determining a mean pitch setpoint βtcl* that is compatible with the propeller(s) taking power that does not exceed the available power margin, the +1 state of the pulse control also being inhibited.

In an implementation of the method in accordance with the invention, the peak-limiting term is:

$$\frac{\partial \beta}{\partial P} \times \Delta P \text{ if } \Delta P < 0 \text{ or } \frac{\partial \beta}{\partial Trq} \times \Delta Trq \text{ if } \Delta Trq < 0$$

In an implementation of the method in accordance with the present invention, the protected mode consists in using at least one flight parameter relating: to the speed of rotation margin ΔΩ available for the rotor(s) of the propeller(s); to the available indicated air speed margin ΔIAS; or to the current dive deflection margin of the longitudinal cyclic control expressed as a percentage of its total deflection amplitude, i.e. ΔDDM=DDM−10%; in order to apply a proportional/integral correction PI to said parameter, and if ΔΩ<−0.6 rad/s, or if ΔIAS<0, or if ΔDDM<0, then the control order is decremented by the result of the proportional/integral correction PI in order to determine a mean pitch setpoint βtcl* compatible with power being taken by the propeller(s) without exceeding the available power margin, the +1 state of the pulse control then being inhibited.

In an implementation in accordance with the invention, the method consists in the following:

if the current dive deflection margin DDM of the longitudinal cyclic control expressed as a percentage of its total deflection amplitude is less than 10%, then the mean pitch setpoint βtcl* is decremented by the value:

$$(DDM-10) \times PPgradddm + PPiddm \times \int(DDM-10\%)dt$$

where PPgradddm and PPiddm are constants;
if the indicated air speed IAS is greater than the velocity never exceeded VNE, then the mean pitch setpoint βtcl* is decremented by the value:

$$(IAS-VNE) \times PPgradias + PPias \times \int(LAS-VNE)dt$$

where PPgradias and PPias are constants; and
if the value of Ω−Ω* is less than −0.6 rad/s, then the mean pitch setpoint βtcl* is decremented by the value:

$$PPgrad\Omega \times (\Omega-\Omega^*) + PPi\Omega \times \int(\Omega-\Omega^*)dt$$

where PPgradΩ and PPiΩ are constants.

In an implementation of the method in accordance with the invention, the power consumed by the propeller(s) is estimated by a specific algorithm, as a function of the pitches β1, β2 of the propellers, of the true air speed TAS, of the speed of rotation Ω of the propellers, and of the air density σ.

In an implementation of the method in accordance with the invention, the power consumed by the propeller(s) is estimated by a specific algorithm as a function of the pitches β1, β2 of the propellers, of the true air speed TAS, of the setpoint speed of rotation Ω* for the propellers, and of the density of the air σ.

In an implementation of the method in accordance with the invention, the power consumed by one or more propellers is measured by sensors such as torque meters on the transmission of the propellers.

Making such an estimate may avoid any need to use torque meters on the propeller transmission, and thus avoid difficulties associated with developing and reliability associated with that kind of sensor.

The objects given to the invention are also achieved with the help of a control and regulation system for a rotorcraft having at least one main lift rotor, at least one variable-pitch propulsive propeller, and at least one power source for driving the main rotor(s) and the propeller(s), said system including means for implementing the control and regulation method as described above.

By way of example, the control and regulation system in accordance with the invention comprises both an emergency mechanical channel or chain for controlling the pitch of the propulsive propeller(s) in direct mode, and an electrical channel or chain for controlling the pitch of the propulsive propeller(s), said electrical channel or chain including means for complying with limits.

By way of example, the mechanical channel or chain comprises:
a Tcl lever for controlling the mean pitch βtcl;
a rudder bar for controlling the differential pitch βd;
a rudder bar damper;
a variable ratio crank of variation that is a function of the position of the Tcl lever in order to reduce the authority of the rudder bar as a function of thrust;
a combiner/coupler for summing and subtracting the mean pitch βtcl and the differential pitch βd; and
a system of links, cables, and pulleys.

By way of example, the electrical channel or chain comprises:
a Tcl beep associated with the collective pitch lever;
a first series actuator for controlling the mean pitch βtcl of the left propeller;
a second series actuator for controlling the mean pitch βtcl of the right propeller;
a first trim actuator for the Tcl lever;
a second trim actuator for the rudder bar;
a computer receiving information from the flight control system FCS and establishing control relationships for the pitch of the propellers;
means for measuring the positions of the pilot controls engaged with the Tcl lever and the rudder bar;
electrical connections; and
means for measuring the positions of the series actuators.

The objects given to the invention are also achieved with the help of a rotorcraft control program for implementing the control and regulation method, wherein the program comprises code stored on a medium such as a memory or embodied by a signal, the code being readable and/or executable by at least one data processor unit such as a computer on board or suitable for mounting on board a rotorcraft in order to control and/or regulate the pitch setting of at least one propulsive propeller, the code including respective code segments for implementing characteristic operations or steps of said control and regulation method.

The objects given to the invention are also achieved with the help of an aircraft of the rotorcraft type, and including a control and regulation system as described above.

The regulation system in accordance with the invention presents a substantial advantage in that it provides protection for the flight envelope and imposes limits by means of propulsive propeller pitch control.

Another advantage of the invention lies in the fact that it makes regulating at least one propulsive propeller compatible with regulating and piloting a helicopter.

Another advantage of the control and regulation method in accordance with the invention lies in the fact that said method enables the aircraft to be regulated and protected in terms of flight envelopes, thereby making it easier to pilot.

Another advantage of the method in accordance with the invention lies in the possibility of controlling air speed or ground speed by means of a three-position pulse control referred to as a Tcl beep, which means that the pilot has no need to be preoccupied by engine/transmission limits.

The control and regulation method in accordance with the invention makes it possible to improve safety by automatically complying with limits.

The protection provided to mechanical assemblies also enables their lifetimes to be increased.

Furthermore, according to the invention, priority is automatically given to the operation of the lift rotor.

The invention also makes it possible to comply with the available ranges for collective pitch and for longitudinal cyclic control of the main rotor by limiting propulsion whenever the dive deflection margin drops below a predefined threshold (propulsive rotor mode) or the collective pitch drops below a predefined threshold (autogyro rotor mode).

BRIEF DESCRIPTION OF THE DRAWINGS

Other aspects, characteristics, and advantages of the invention appear from the following description with embodiments given by way of illustration and with reference to the accompanying figures, in which:

FIG. 1 is a diagrammatic perspective view of an embodiment of a hybrid helicopter of the invention;

FIG. 2 is a diagram of the functional chain of an example of a design for the control and regulation system in accordance with the invention, operating in a direct mode without protection, in a first variant;

FIG. 3 is a diagram of the functional chain of an example of a design for the control and regulation system in accordance with the invention, operating in a regulated mode with protection, in the first variant;

FIG. 4 is a diagram of the functional chain of an example of a design for the control and regulation system in accordance with the invention, operating in a direct mode without protection, in a second variant;

FIG. 7 is a diagram of the functional chain of an example of a design for the control and regulation system in accordance with the invention, operating in a protected mode, in the second variant with a second example of protection;

FIG. 8 is a diagram of the functional chain of an example of a design for the control and regulation system in accordance with the invention, operating in a protected mode, in the second variant, with a third example of protection;

FIG. 9 is a diagram of the functional chain of an example of a design for the control and regulation system in accordance with the invention, operating in a protected mode, in the second variant, with a fourth example of protection;

FIG. 10 is a diagram of the functional chain of an example of a design for the control and regulation system in accordance with the invention, operating in a protected mode, in the second variant, with a fifth example of protection; and FIG. 11 is a diagram of an example embodiment of an architecture for the propeller pitch control channel or chain involving the regulation system in accordance with the invention.

MORE DETAILED DESCRIPTION

Figure 5:
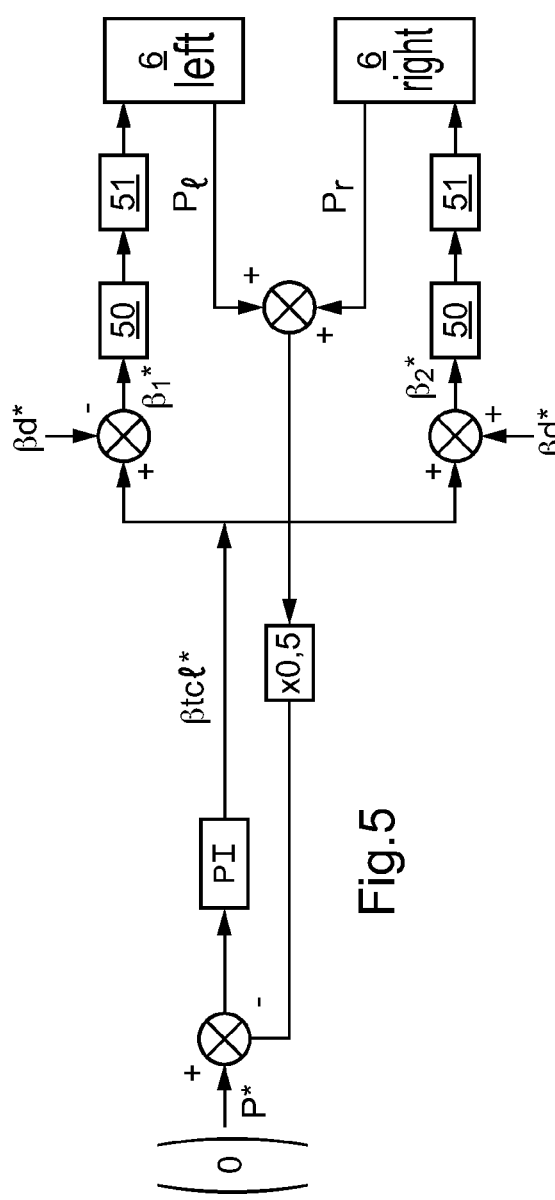
FIG. 5 is a diagram of the functional chain of an example of a design for the control and regulation system in accordance with the invention, operating in a regulated mode without protection, in a second variant.

In the meaning of the present application, the term "hybrid helicopter" designates a rotorcraft fitted with thruster(s) of the propeller kind, with regulation adapted to the operation both of the main lift rotor(s) and of the propellers.

Unless specified explicitly or implicitly to the contrary, the term "rotor" designates a rotary wing of the rotorcraft.

Various concepts used in the present description are also defined briefly. Thus:

IAS means indicated air speed;
TAS means true air speed; and
VNE means velocity never exceeded, i.e. maximum authorized air speed.

Unless specified explicitly or implicitly to the contrary, elements that are structurally and functionally identical and that appear in more than one of the figures are given the same references in each of them.

With reference to FIG. 1, in particular, the hybrid helicopter 1 comprises a fuselage 2, with a cockpit 7 at its front end, a rotor 10 for rotating blades 11 under drive developed by two turbine engines 5 located on top of the fuselage 2 on either side of the plane of symmetry of the aircraft (not visible in FIG. 1 because of the presence of fairings), and passing via a first main gearbox MGB (not shown in FIG. 1).

Furthermore, the hybrid helicopter 1 has a high wing 3 made up of two half-wings 8 located at the top of the fuselage 2, the half-wings 8 being substantially rectangular in shape in plan view and presenting a negative dihedral angle.

The hybrid helicopter 1 is propelled by two propellers 6 driven by the two turbine engines 5, a respective propeller 6 being located at each of the outer ends of the wing 3.

Furthermore, in the vicinity of the rear end of the fuselage 2, there are provided stabilizer and control surfaces comprising, for pitch, a horizontal stabilizer 30 with two pitch control surfaces 25 and 35 that are movable relative to a front portion 34, and, for yaw, two appropriate tail stabilizers 40, each located at a respective end of the horizontal stabilizer 30.

Advantageously, the tail stabilizers 40, which are vertical or inclined relative to the vertical, are constituted by respective stationary front portions (or fins) 44 with respective movable rear portions or yaw-control rudders 45.

Specifically, the horizontal stabilizer 30 and the tail stabilizers 40 form an upside-down U-shape on the fuselage 2.

From a dimensional point of view, the hybrid helicopter 1 preferably corresponds to the following characteristics relating to an aircraft having a maximum permissible takeoff weight of about 8 metric tonnes:

rotor diameter D: about 16 meters (m);
propeller diameter d: 2.6 m;
wing span L: 8 m;
aspect ratio λ of the wing: 5.3.

In addition, the hybrid helicopter 1 fitted with an integrated drive train (not shown in FIG. 1) that comprises not only the two turbine engines 5, the rotor 10, and the two propellers 6, but also a mechanical interconnection system (not shown in FIG. 1) between those elements, arranged in such a manner that it should be understood that the rotor 10 and the propellers 6 rotate in planes that are orthogonal and not parallel.

With this configuration, the hybrid helicopter 1 is remarkable in that the speeds of rotation of the outlets from the turbine engines, of the propellers, of the rotor, and of the mechanical interconnection system are mutually proportional, with the proportionality ratio being constant regardless of the flight configuration of the hybrid helicopter under normal conditions of operation of the incorporated drive train.

Naturally, particular devices lying outside the ambit of the invention are activated in the event of mechanical failures, if any.

The control and regulation method for a rotorcraft having at least one main lift rotor, at least one variable-pitch propulsion propeller 6, and at least one drive source for driving the main rotor(s) and the propeller(s) 6, consists in generating at least one mean pitch setpoint βtcl* for the propeller(s) 6, as a function of a thrust variation control order Tcl and as a function of the power consumed by the propeller(s) 6.

The method in accordance with the invention consists in defining different modes of operation.

Amongst the modes of operation, there is a forced mode in which, in the event of total loss of power from the engine(s), the mean pitch βtcl is automatically forced under pilot control to a calculated pitch value. The forced mode is engaged under pilot override control.

In this forced mode, the override value of the mean pitch βtcl is such that:

$$\beta tcl = \beta_0 + \arctan\left(\frac{TAS}{0.75R \cdot \Omega}\right) + I(Tcl)^{-5,+5}$$

where $\beta_0$ is a constant, R is the radius of the propellers 6, Ω is the speed of rotation of the propellers, TAS is the true air speed of the aircraft, and $I(Tcl)^{-5,+5}$ is the integral of the function Beep(Tcl) having the value −1, 0, or +1, peak-limited at −5° and at +5, indicating that it is possible for the pilot to modify the mean pitch by acting on the thrust variation control Tcl with a pitch value lying in the range +5° and −5°.

The constant $\beta_0$ is the pitch value of the propellers 6 at which thrust is zero, at zero TAS.

A first variant implementation of the method in accordance with the invention is shown in FIGS. 2 and 3.

Amongst these modes, there is also a direct mode, as shown in FIG. 2, in which the value of the mean pitch βtcl results directly from a function Beep(Tcl) that has three states −1, 0, and +1, i.e. from a control order Tcl.

The direct mode is engaged automatically when the mean pitch βtcl of the propeller(s) 6 is less than a first value βtcl1 or when the power consumed by the propeller(s) is less than a second value Pthr1.

The thrust variation control order Tcl is obtained by actuating a Tcl lever or by actuating a pulse control having the three states −1, 0, +1 of the function Beep(Tcl).

The mean pitch setpoint βtcl* corresponding to the thrust variation control may come, for example, directly from an integrator I that receives as input a state from the pilot's control Beep(Tcl). The mean pitch setpoint βtcl* is then corrected with the right and left differential pitch βd to obtain the final left and right pitch setpoints β1* and β2* for application to respective electrical or hydraulic actuators 50. Thereafter, the actuators 50 control respective pitch servo-controls 51.

Amongst the modes in accordance with the invention, there is also a regulated mode, in which the power consumed by the propeller(s) 6 is regulated as a function of a power setpoint derived from a thrust variation control Tcl.

In the first variant implementation, the regulated mode is engaged automatically when firstly the mean pitch βtcl is greater than a third value βtcl2 and secondly the power P consumed by the propeller(s) 6 is greater than a fourth value Pthr2.

The values Pthr2, βtcl2, Pthr1, and βtcl1 are determined in known manner by analyzing the polar plot of the propellers 6. Analyzing the "polar" of the propellers 6 consists in determining the power consumed by the propellers 6 as a function of pitch and at constant speed of rotation. A different curve is obtained for each forward speed of the aircraft. By way of example, when the forward speed of the aircraft decreases, the power consumed increases. This parameter therefore needs to be monitored in order to avoid exceeding predefined limits.

Reference may be made for example to FIG. 3 that shows the functional change for pitch control of the propulsive propellers 6 in regulated mode and in cruising flight in a first variant implementation.

The method in accordance with the invention also includes a protected mode, which is activated in the context of the various other operating modes, not including forced mode, when at least one of the various limiting physical parameters has reached or has exceeded its corresponding limit.

In protected mode, the mean pitch setpoint βtcl* is decreased automatically.

Protected mode is activated when at least one of the following conditions concerning the limiting physical parameters IAS, DDM, Ω, PP1max, Ptot, is satisfied:

IAS≥VNE;

DDM≤10%;

Ω−Ω*<−0.6 radians per second (rad/s);

PP1max>(Trqmax_aut×Ω); and

Ptot>Pmd;

where Trqmax_aut is the maximum torque that can be accepted by the transmission system, PP1max is the current maximum value of the powers of the right and left propellers 6, Ptot is the total power consumed by the propulsive propellers, Pmd is the maximum power available from the engine for the propulsive propellers, IAS is the indicated air speed, VNE is the velocity never exceeded, Ω is the speed of rotation of the propulsive propellers, Ω* is the setpoint speed of rotation for said propellers, and DDM is the current dive deflection margin of the longitudinal cyclic control expressed as a percentage of its total deflection amplitude.

The speed of rotation setpoint Ω* may be considered as a constant for conventional helicopters or for aircraft in accordance with the invention. Nevertheless, methods that are themselves known exist for calculating and/or determining the speed of rotation setpoint for propulsive propellers. In certain applications, at constant aircraft speed, Ω* varies as a function of atmospheric conditions such as altitude and temperature.

In the first variant shown by way of example in FIG. 3, the method in accordance with the invention consists, in the context of protected mode, in using a limit/regulation function on the power setpoint P* and a proportional integral correction PI to determine the mean pitch setpoint βtcl* in regulated mode using a determined algorithm.

The instructions coming from a Beep(Tcl) control pass through an integrator I prior to being corrected or diminished by a limiter/regulator L/R. The limiter/regulator serves to regulate and correct the thrust instructions, i.e. the power setpoint P*, as a function of predetermined limits relating to the current dive deflection margin DDM for the longitudinal cyclic control expressed as a percentage of its total deflection amplitude at the indicated air speed IAS, at the available maximum power Pmd for the propulsive propellers 6, at the available transmission torque Trq, or at the speed of rotation Ω of the propeller rotors 6.

The signal delivered by the limiter/regulator L/R, corresponding where appropriate to the peak-limited or decreased power setpoint Ped*, then has subtracted therefrom the mean power P consumed by the left and right propellers 6, i.e. (Pl+Pr)/2 where Pl is the power consumed by the left propeller 6 and Pr is the power consumed by the right propeller 6. This produces a corrective mean pitch setpoint value βtcl* for application to the propellers 6, with this being done via a proportional/integral type regulation loop PI operating continuously. The decremented or diminished setpoint power Ped* is equal to the setpoint power P* if no limit has been reached or exceeded. An operator OP1 serves to calculate the term Ped*−P that is applied to the proportional/integral correction PI.

In cruising mode, the limiter/regulator L/R calculates and modifies the power setpoint P*, where appropriate, in application of a determined algorithm in which:

if the thrust instruction for the propeller(s) 6 at the output from the integrator I is greater than the value:

$$\frac{\Omega}{\Omega^*} \times Pmd$$

then the power setpoint P* is limited to said value, where Pmd is the maximum available power from the engine for the propulsive propellers, Ω and Ω* being respectively the speed of rotation of the propeller(s) 6 and the corresponding setpoint;

if the current dive deflection margin DDM for the longitudinal cyclic control expressed as a percentage of the total deflection amplitude is less than 10%, then the power setpoint P* is decremented by the value:

(DDM−10%)×PPgradddm+PPiddm×∫(DDM−10%)dt until the initial margin has been restored, PPgradddm and PPiddm being constants;
if the indicated air speed IAS is greater than the velocity never exceeded VNE, then the power setpoint P* is decremented by the value:

(IAS−VNE)×PPgradias+PPiias×∫(VAS−VNE)dt

PPgradias and PPiias being constants;
if the maximum value of the current powers of the right and left propeller(s) PP1max is greater than the value (Trqmax_aut×Ω), then the power setpoint P* is decremented by the value:

PP1max−(Trqmax_aut×Ω)

where Trqmax_aut is a constant relating to maximum torque; and
if the value of Ω−Ω* is less than −0.6 rad/s, the power setpoint P* is decremented by the value:

PPgradΩ×(Ω−Ω*)+PPiΩ×∫(Ω−Ω*)dt

PPgradΩ and PPiΩ being constants.

The constants PPgradddm, PPgradias, PPgradΩ, PPiddm, PPias, and PPiΩ are determined by mode placement of a closed loop that controls the propellers 6 and that is included in the overall system of the aircraft.

The constant Trqmax_aut is determined by calculation on the transmission system, for example.

A second preferred variant implementation of the method in accordance with the invention is shown in FIGS. 4 to 10.

The direct mode is engaged when the thrust variation control order Tcl is obtained by using a pulse control having three states −1, 0, +1, i.e. the function Beep(Tcl), by actuating the +1 or the −1 state.

The regulated mode is engaged when P>Pthr at the same time as an absence of any thrust variation control order Tcl, by activating the 0 state of the pulse control having three states −1, 0, +1, where P with the current power at the propellers and Pthr is a constant selected by analyzing the polars of the propulsive propellers 6.

FIG. 4 shows the direct mode in this second variant implementation of the method, in the absence of protection, i.e. during a stage of flight in which the current values of certain flight parameters are far away from their limit values.

By actuating the Beep(Tcl) control, the +1 or the −1 state is activated in order to generate a signal that is transmitted to an integrator I. The integrator outputs a mean pitch setpoint βtcl* for the propellers 6.

The correction associated with the differential pitch βd, itself known, is not described, but it is clear that it is involved in order to determine the pitch setpoints β1* and β2* for the left and right propellers 6.

FIG. 5 shows the regulated mode in the second variant implementation of the method, in the absence of protection, i.e. in a stage of flight in which the current values of certain flight parameters are far away from their limit values.

In the absence of the −1 and +1 states being activated, the regulated mode is engaged automatically whenever P>Pthr, where Pthr is a threshold selected by analyzing the polars of the propulsive propellers 6.

The power setpoint P*, corresponding to the most recent setpoint power prior to engaging the regulated mode, is decreased by the mean value P=(Pl+Pr)/2 of the powers Pl and Pr consumed respectively by the left and right propellers 6. The powers Pl and Pr are measured or calculated.

The difference between the setpoint power P* and the consumed power P is then forwarded to a proportional/integral corrector PI that transforms said difference into a mean pitch setpoint βtcl*. This provides a regulation loop enabling the mean pitch control to be corrected continuously by delivering a corresponding mean pitch setpoint βtcl*.

In the second variant, the method in accordance with the invention consists in defining a constant pitch mode in which the mean pitch βtcl of the propulsive propeller(s) 6 is constant.

In an implementation of the method in accordance with the invention, the constant pitch mode is engaged when P≤Pthr while simultaneously the 0 state from the three states −1, 0, +1 of the pulsed thrust variation control Tcl is active, P being the current power at the propellers, and Pthr being a constant selected by analyzing the polars of the propulsive propellers 6.

In the second variant in accordance with the invention, the method consists, in protected mode, in using at least one loop for monitoring a limiting physical parameter, in verifying whether the limit associated with said parameter has been reached or exceeded, and if so, in maintaining activation of the protected mode.

In this variant, the method consists in selecting, in the following priority order 1 to 5, the limiting physical parameter for which the corresponding limit is reached or exceeded and for which the monitoring loop is activated, i.e.:
1) the speed of rotation Ω of the propeller(s) 6;
2) the engine power Pmd available for the propellers 6;
3) the transmission torque Trq;
4) the current dive deflection margin DDM of the longitudinal cyclic control expressed as a percentage of its total deflection amplitude; and
5) the indicated air speed IAS.

The protected mode consists in using at least one flight parameter relating to the available power margin ΔP or to the available torque margin ΔTrq in order to peak-limit or diminish the control order if ΔP<0 or if ΔTrq<0, thereby determining a mean pitch setpoint βtcl* that is compatible with the propeller(s) taking power that does not exceed the available power margin or the available torque margin, the +1 state of the pulse control of the Beep(Tcl) function also being inhibited.

In an implementation of the method in accordance with the invention, the peak-limiting term is:

$$\frac{\partial \beta}{\partial P} \times \Delta P \text{ if } \Delta P < 0 \text{ or } \frac{\partial \beta}{\partial Trq} \times \Delta Trq \text{ if } \Delta Trq < 0$$

The protected mode also consists in using at least one flight parameter relating: to the speed of rotation margin ΔΩ available for the rotor of the propeller(s) 6; to the available indicated air speed margin ΔIAS; or to the current dive deflection margin of the longitudinal cyclic control expressed as a percentage of its total deflection amplitude, i.e. ΔDDM=DDM−10%; in order to apply a proportional/integral correction PI to said parameter.

If ΔΩ<−0.6 rad/s, or if ΔIAS<0, or if ΔDDM<0, then the control order is decremented by the result of the proportional/integral correction PI in order to determine a mean pitch setpoint βtcl* compatible with power being taken by the propeller(s) without exceeding the available power margin, the +1 state of the pulse control then being inhibited.

In an implementation in accordance with the invention, the method consists:
if the current dive deflection margin DDM of the longitudinal cyclic control expressed as a percentage of its total deflection amplitude is less than 10%, in decrementing the mean pitch setpoint βtcl* by the value:

(DDM−10)×PPgradddm+PPiddm×∫(DDM−10%)dt where PPgradddm and PPiddm are constants;
if the indicated air speed IAS is greater than the velocity never exceeded VNE, in decrementing the mean pitch setpoint βtcl* by the value:

(IAS−VNE)×PPgradias+PPias×∫(IAS−VNE)dt where PPgradias and PPias are constants; and
if the value of Ω−Ω* is less than −0.6 rad/s, in decrementing the mean pitch setpoint βtcl* by the value:

PPgradΩ×(Ω−Ω*)+PPiΩ×∫(Ω−Ω*)dt where PPgradΩ and PPiΩ are constants.

In a second variant, once protected mode is engaged or activated, it takes the place of the initial mode of operation, e.g. regulated mode or direct mode, until good operating conditions are reestablished.

Figure 6:
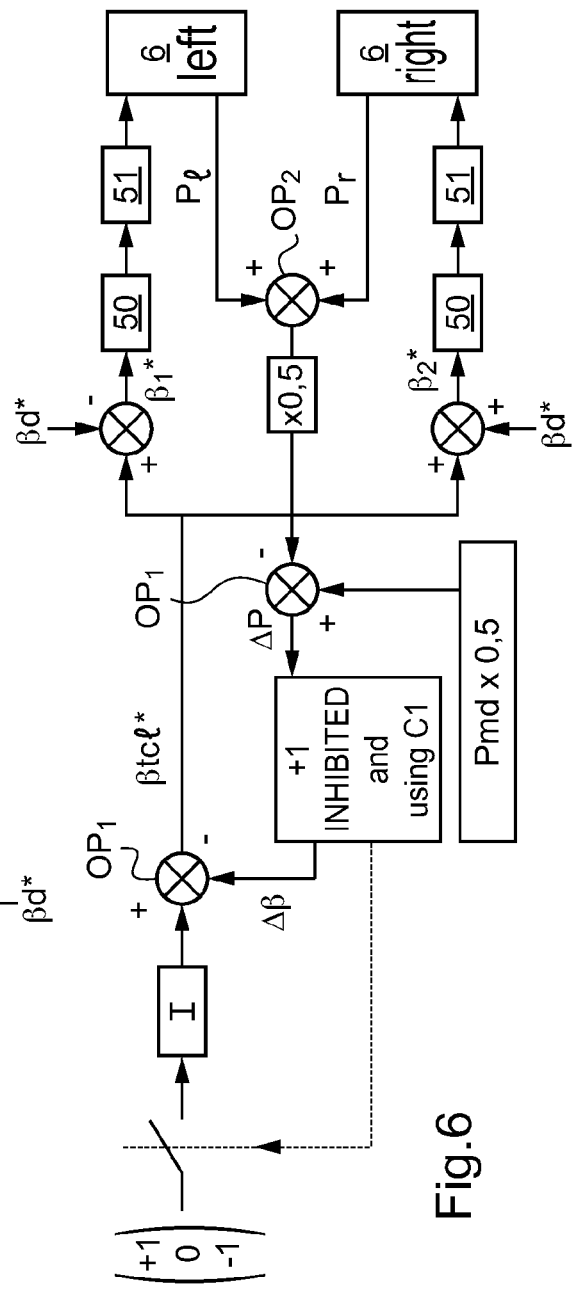
FIG. 6 is a diagram of the functional chain of an example of a design for the control and regulation system in accordance with the invention, operating in a protected mode, in the second variant with a first example of protection.

FIG. 6 applies to the second variant and shows a functional chain in an example designed for the control and regulation system in accordance with the invention that is implementing the protected mode. In this protected mode, the available power margin Pmd for the propellers 6 is converted into a mean pitch that is peak-limited, where necessary, in order to reduce a mean pitch setpoint βtcl*. This setpoint prevents a mean pitch control leading to excessive power being taken by the propeller(s) 6.

In FIG. 6, the signal from a Beep(Tcl) control passes via an integrator I prior to reaching a first operator OP1 that delivers a mean pitch setpoint βtcl*.

Where necessary, this operator OP1 also makes it possible to correct the pitch setpoint from Beep(Tcl) and the integrator I by using a correction value Δβ, also referred to as the peak-limiting term. At its output, the operator OP1 delivers the result of taking the difference between the two input values.

Another operator OP2 outputs the result of adding two input values Pl and Pr.

The correction value used for decreasing or peak-limiting the pitch setpoint depends on the calculated difference ΔP=(Pmd×0.5)−P, where P is equal to (Pl+Pr)/2, i.e. half the total power consumed by both propellers 6, and Pmd is the maximum available power for said propellers 6. This difference ΔP is calculated by a second operator OP1.

If ΔP≥0, the correction value Δβ for the mean pitch setpoint βtcl* is zero and the regulation system exits the protected mode.

If ΔP<0, the correction value Δβ for the mean pitch setpoint βtcl* is $$\frac{\partial \beta}{\partial P} \times \Delta P,$$

where $$\frac{\partial \beta}{\partial P}$$

represents pitch variation relative to consumed power variation. In addition, activation of the +1 state is inhibited, with only activation of the −1 state being possible.

This correction value Δβ is determined by a calculator/comparator C1 associated with the second operator OP1, calculating ΔP, or any other means serving to make a comparison and to forward a signal that is an image of said comparison. The calculator/comparator C1 serves for example to determine the term $$\frac{\partial \beta}{\partial P}$$

and the sign of the term ΔP.

FIG. 7 shows a variant of protection in implementing the method in accordance with the invention. It relates to the protected mode, with protection based on the torque margin ΔTrq available for the propellers 6.

The torque margin ΔTrq corresponds to the difference between the maximum authorized torque Trqmax_aut for a propeller 6 and the maximum value of the measured or calculated torques Trqmax_mes for the left and right propellers 6.

The correction value Δβ used for decreasing or peak-limiting the mean pitch setpoint depends on the calculated difference:

ΔTrq=Trqmax_aut−Trqmax_mes

If ΔTrq≥0, the correction value Δβ for the mean pitch setpoint is zero and the regulation system exits the protected mode.

If ΔTrq<0, the correction value Δβ for the mean pitch setpoint is $$\frac{\partial \beta}{\partial Trq} \times \Delta Trq,$$

where $$\frac{\partial \beta}{\partial Trq}$$

represents pitch variation relative to torque variation. In addition, activation of the +1 state is inhibited, with only activation of the −1 state being possible.

This correction value Δβ is determined by a calculator/comparator C2 associated with the second operator OP1 to calculate ΔTrq, or any other means serving to make a comparison and to forward a signal that is the image of said comparison. By way of example, the calculator/comparator C2 enables the term $$\frac{\partial \beta}{\partial Trq}$$

to be determined and also the sign of ΔTrq.

In order to determine the terms $$\frac{\partial \beta}{\partial Trq} \text{ and } \frac{\partial \beta}{\partial P},$$

the following procedure is used, for example:
a) a family of curves D1, D2, D3 is plotted in a diagram in which the pitch β0.75 of a blade of the propellers 6 at a distance equal to 0.75 times the span R of the blade is plotted along the abscissa and the power coefficient CP of the first and second propellers 6 is plotted up the ordinate, each curve D1, D2, D3 being established for a given coefficient of advance λ1, λ2, λ3; and then b) an intermediate equation is determined from the family of curves, giving the power coefficient CP as a function of said pitch β0.75 of a blade of a propeller at a distance equal to 0.75 times the span R of said blade, and as a function of the coefficient of advance.

The power coefficient CP of a propeller is given by:

$$CP = \frac{P}{0.5 \times \rho \times \pi \times R^2 \times U^3}$$

Where P is the power of the propeller, ρ is the density of air, R is the span of a blade of the propeller, and U is the speed of the free end of a blade of the propeller.

Thus, during step b), the family of curves D1, D2, D3 is established experimentally. Each curve D1, D2, D3 is established for a predetermined coefficient of advance λ1, λ2, λ3, with each coefficient of advance λ1, λ2, λ3 being equal to the quotient of a true air speed TAS of the hybrid helicopter divided by the speed U at the free end of the blade, said speed U at the free end of the blade being equal to the product of the speed of rotation Ω of a propeller multiplied by its span R.

It will readily be understood that a larger number of curves could be used.

It then suffices to implement a conventional mathematical method, e.g. a polynomial regression method, in order to determine said intermediate equation CP=f(β0.75,λ).

Thereafter, a first equation is determined that gives a power gradient GRD as a function of pitch as a function of the partial derivative $$\frac{\partial CP}{\partial \beta}$$

of said intermediate equation relative to pitch. Thus, the first equation is:

$$GRD = \frac{\partial P}{\partial \beta} = 0.5 \times \rho \times \pi \times R^2 \times U^3 \times \frac{\partial CP}{\partial \beta}(\beta, \lambda)$$

where ρ is the density of air, and "×" is the multiplication sign.

The first equation is then stored in a memory of computer means.

Under such conditions, the following steps are performed in real time in flight.

In a step c), the computer means determine a power gradient GRD as a function of pitch in real time using the first equation as stored in memory, by calculating the value of said partial derivative at the current mean pitch βcur and at the current coefficient of advance λcur as determined in real time in flight. More precisely, the current power gradient GRD as a function of pitch is equal to the value of said first equation at the current mean pitch βcur, at the current speed Ucur at the free end of the blade, of the current air density ρcur, and at the current coefficient of advance λcur, i.e. equal to:

$$GRD = 0.5 \times \rho cur \times \pi \times R^2 \times Ucur^3 \times \frac{\partial CP}{\partial \beta}(\beta cur, \lambda cur)$$

The same procedure may be repeated for the term $$\frac{\partial \beta}{\partial Trq}$$

insofar as P=Trq×Ω, and consequently $$\frac{\partial Trq}{\partial \beta} = \frac{\partial P}{\partial \beta} \times \frac{1}{\Omega}.$$

FIG. 8 shows a variant of protection in an implementation of the method in accordance with the invention. This involves the protection mode being based on the speed of rotation Ω of the propellers 6.

The method consists in using the flight parameter relating to the difference ΔΩ=Ω−Ω* between the speed of rotation Ω of the rotors of the propellers 6 and the corresponding setpoint Ω* in order to make a proportional/integral correction PI on said parameter. The term ΔΩ is calculated by a first operator OP1.

If the term ΔΩ<−0.6 rad/s, the control order is decremented by the result from the proportional/integral correction PI, i.e.:

PPgradΩ×(Ω−Ω*)+PPiΩ×∫(Ω−Ω*)dt in order to determine a mean pitch setpoint βtcl*. Another operator OP2 serves to add the result of the proportional/integral correction PI with a control from the integrator I associated with Beep(Tcl). The +1 state of the pulse control Beep(Tcl) is also inhibited.

This setpoint is then compatible with the propeller(s) 6 drawing power that does not exceed the available power margin. By way of example, the speed of rotation Ω is measured by means of a sensor S1.

FIG. 9 shows a variant of protection in an implementation of the method in accordance with the invention. In this protected mode, protection is provided on the basis of the indicated air speed IAS.

The method consists in using the flight parameter relating to the difference ΔIAS=IAS−VNE between the indicated air speed IAS and the velocity never exceeded VNE, as calculated by the first operator OP1 in order to make a proportional/integral correction PI on said parameter.

If the term ΔIAS<0, then the control order is decremented by the result of the proportional/integral correction PI, i.e.:

(IAS−VNE)×PPgradias+PPiias×∫(IAS−VNE)dt in order to determine a mean pitch setpoint βtcl*. Another operator OP2 serves to add the result of the proportional/integral correction PI with a control from the integrator I associated with Beep(Tcl). The +1 state of the pulse control Beep(Tcl) is also inhibited.

This setpoint is compatible with the propellers 6 drawing power that does not exceed the available power margin. By way of example, the indicated air speed IAS is measured by means of a sensor S2.

FIG. 10 shows a variant of protection in an implementation of the method in accordance with the invention. It shows a protected mode with protection based on the current dive deflection margin DDM for the longitudinal cyclic command expressed as a percentage of the total deflection amplitude corresponding to the longitudinal cyclic control as measured for example using a sensor S3.

The method consists in using the flight parameter relating to the difference between the current dive deflection margin of the longitudinal cyclic control expressed as a percentage of its total deflection amplitude, $$\Delta DDM=DDM-10\%$$

calculated by a first operator OP1 for the purpose of making a proportional/integral correction PI on said parameter. If the term $\Delta DDM<0$, then the control order is decremented by the result of the proportional/integral correction PI, i.e.:

$$(DDM-10)\times PPgradddm+PPiddm\times f(DDM-10\%)dt$$

in order to determine a mean pitch setpoint βtcl*. Another operator OP2 serves to add the result of the proportional/integral correction PI to a control from the integrator I associated with Beep(Tcl). The +1 state of the pulse control is also inhibited.

This setpoint is then compatible with the propeller(s) 6 drawing power that does not exceed the available power margin.

In an implementation of the control and regulation method in accordance with the invention, the power P consumed by the propeller(s) 6 is estimated by a specific algorithm, as a function of the pitches β1, β2 of the propellers 6, of the true air speed TAS, of the speed of rotation Ω of the propellers 6, and of the air density σ.

In an implementation of the control and regulation method in accordance with the invention, the power P consumed by the propeller(s) 6 is estimated by a specific algorithm as a function of the pitches β1, β2 of the propellers 6, of the true air speed TAS, of the setpoint speed of rotation Ω* for the propellers 6, and of the density of the air σ.

In another implementation, the power consumed by one or more propellers 6 is measured by means of sensors of the torque meter type on the transmission for the propellers 6.

FIG. 11 shows an embodiment of an architecture for a pitch control channel or chain for the propellers 6 that includes the regulation system in accordance with the invention.

The control and regulation system in accordance with the invention comprises both an emergency mechanical channel or chain for controlling the pitch of the propulsive propeller(s) 6 in direct mode, and an electrical channel or chain for controlling the pitch of the propulsive propeller(s) 6, said electrical channel or chain including means for complying with limits.

The mechanical channel or chain, represented in particular by chain-dotted lines, comprises:
- a Tcl lever 60 for controlling the mean pitch βtcl;
- a rudder bar 67 for controlling the differential pitch βd;
- a rudder bar damper 68;
- a variable ratio crank 63 of variation that is a function of the position of the Tcl lever 60 in order to reduce the authority of the rudder bar 67 as a function of thrust;
- a combiner/coupler 66 for summing and subtracting the mean pitch βtcl and the differential pitch βd; and
- a system of links, cables, and pulleys.

The electrical channel or chain, represented in particular by doted lines, comprises:
- a Tcl beep associated with the collective pitch lever 70;
- a first series actuator 61 for controlling the mean pitch βtcl of the left propeller 6;
- a second series actuator 62 for controlling the mean pitch βtcl of the right propeller 6;
- a first trim actuator 65 for the Tcl lever 60;
- a second trim actuator 69 for the rudder bar 67;
- a computer 64 receiving information from the flight control system (FCS) and establishing control relationships for the pitch of the propellers 6;
- means for measuring the positions of the pilot controls engaged with the Tcl lever 60 and the rudder bar 67;
- electrical connections; and
- means for measuring the positions of the series actuators 61 and 62.

In known manner, the series actuators 61 and 62 enable the pitch servo-control 51 to be actuated.

The trim actuators 65 and 69 are actuated by the autopilot to provide real-time adjustment of the positions of the Tcl lever 60 and of the rudder bar 67.

In an embodiment in accordance with the invention, the control system includes sensors of the torque meter type mounted on the transmission of the propellers 6 in order to measure the power consumed by the propellers 6. This makes it possible to perform regulation directly on power consumption as measured at the propellers 6.

The present invention also provides a program for controlling a rotorcraft in order to implement the control and regulation method. The program comprises code stored on a medium such as a memory or embodied by a signal, the code being readable and/or executable by at least one data processor unit such as a computer on board or suitable for mounting on board a rotorcraft in order to control and/or regulate the pitch setting of at least one propulsive propeller, the code including respective code segments for implementing characteristic operations or steps of said control and regulation method.

The method in accordance with the invention, as described more particularly for an application having a main rotor and two propulsive propellers 6, can be transposed without difficulty to an application having a single propulsive propeller 6, or two main lift rotors, without thereby going beyond the ambit of the present invention.

On-board avionics systems include various measurement and/or computation functions for providing the flight parameter values that are used in the context of the present invention. These functions are themselves known and are consequently not described.

Naturally, the present invention may be subjected to numerous variants as to its implementation. Even though several embodiments and implementations are described, it will readily be understood that it is not conceivable to identify exhaustively all possible embodiments. It is naturally possible to envisage replacing any of the means described or any of the steps described by equivalent means or an equivalent step, without going beyond the ambit of the present invention.

What is claimed is:

1. A control and regulation method for a rotorcraft having at least one main lift rotor, at least one variable-pitch propulsive propeller (6), and at least one power source for driving the main rotor(s) and at least one propeller (6), said method consisting in generating at least one mean pitch setpoint βtcl* for the propeller(s) (6) as a function of thrust variation control order Tcl and as a function of the power consumed by the propeller(s) (6), wherein the method consists in defining a plurality of operating modes, including the following:
- a direct mode, in which the value of the mean pitch results directly from the thrust variation control order Tcl;
- a forced mode, in the event of the main rotor(s) also rotating, in which the mean pitch is forced automatically under control of the pilot to a calculated pitch value;
- a regulated mode, in which the power consumed by the propeller(s) (6) is regulated as a function of a power setpoint from a thrust variation control Tcl; and a protected mode that is activated when operating in the various other operating modes other than forced mode, in the event of at least one of various limiting physical parameters reaching or exceeding its corresponding limit, and in which the mean pitch setpoint βtcl* is reduced automatically.

2. A method according to claim 1, consisting in activating protected mode when at least one of the following conditions concerning the limiting physical parameters IAS, DDM, Q, PP1max, Ptot, is satisfied:

IAS≥VNE;

DDM≤10%;

Ω−Ω*<−0.6 radians per second (rad/s);

PP1max>(Trqmax_aut×Ω); and

Ptot>Pmd;

where Trqmax_aut is the maximum torque that can be accepted by the transmission system, PP1max is the current maximum value of the powers of the right and left propellers (6), Ptot is the total power consumed by the propulsive propellers, Pmd is the maximum power available from the engine for the propulsive propellers, IAS is the indicated air speed, VNE is the velocity never exceeded, Ω is the speed of rotation of the propulsive propellers, Ω* is the setpoint speed of rotation for said propellers, and DDM is the current dive deflection margin of the longitudinal cyclic control expressed as a percentage of its total deflection amplitude.

3. A method according to claim 1, wherein the forced mode is engaged on pilot override control.

4. A method according to claim 1, wherein in forced mode, the override value of the mean pitch βtcl is such that:

$$\beta tcl = \beta_0 + \arctan\left(\frac{TAS}{0.75R \cdot \Omega}\right) + I(Tcl)^{-5,+5}$$

where $\beta_0$ is a constant, R is the radius of the propellers (6), Ω is the speed of rotation of the propellers, TAS is the true air speed of the aircraft, and $I(Tcl)^{-5,+5}$ is the integral of the function Beep(Tcl) having the value −1, 0, or +1, peak-limited at −5° and at +5, indicating that it is possible for the pilot to modify the mean pitch by acting on the thrust variation control Tcl with a pitch value lying in the range +5° and −5°.

5. A method according to claim 1, wherein the direct mode is engaged automatically when the mean pitch βtcl of the propeller(s) (6) is less than a first value βtcl1 or when the power consumed by the propeller(s) is less than a second value Pthr1.

6. A method according to claim 1, wherein the regulated mode is engaged automatically when firstly the mean pitch βtcl is greater than a third value βtcl2 and secondly the power P consumed by the propeller(s) is greater than a fourth value Pthr2.

7. A method according to claim 1, wherein, in the protected mode, it consists in using a limit/regulation function on the power setpoint P* together with a proportional/integral correction PI on (P*-P) or (Ped*-P) to determine the mean pitch setpoint βtcl*, in regulated mode, using a determined algorithm, where P is the power consumed by the propeller(s) (6) and Ped* is the same setpoint after being decremented or decreased.

8. A method according to claim 7, wherein the algorithm consists in the following:
if the thrust instruction for the propeller(s) (6) at the output from the integrator I is greater than the value:

$$\frac{\Omega}{\Omega^*} \times Pmd$$

then the power setpoint P* is limited to said value, $$\frac{\Omega}{\Omega^*} \times Pmd$$

where Pmd is the maximum available power from the engine for the propulsive propellers (6), Ω and Ω* being respectively the speed of rotation of the propeller(s) (6) and the corresponding setpoint;
if the current dive deflection margin DDM for the longitudinal cyclic control expressed as a percentage of the total deflection amplitude is less than 10%, then the power setpoint P* is decremented by the value:

(DDM−10%)×PPgradddm+PPiddm×∫(DDM−10%)dt

PPgradddm and PPiddm being constants;
if the indicated air speed IAS is greater than the velocity never exceeded VNE, then the power setpoint P* is decremented by the value:

(IAS−VNE)×PPgradias+PPiias×∫(IAS−VNE)dt

PPgradias and PPiias being constants;
if the maximum value of the current powers of the right and left propeller(s) PP1max is greater than the value (Trqmax_aut×Ω), then the power setpoint P* is decremented by the value:

PP1max−(Trqmax_aut×Ω)

where Trqmax_aut is a constant relating to maximum torque; and
if the value of Ω−Ω* is less than −0.6 rad/s, the power setpoint P* is decremented by the value:

PPgradΩ×(Ω−Ω*)+PPiΩ×∫(Ω−Ω*)dt

PPgradΩ and PPiΩ being constants.

9. A method according to claim 1, consisting in defining a constant pitch mode in which the mean pitch of the propulsive propeller(s) (6) is constant.

10. A method according to claim 9, wherein the constant pitch mode is engaged when P≤Pthr while simultaneously the 0 state from the three states −1, 0, +1 of the pulsed thrust variation control Tcl is active, P being the current power at the propeller(s) (6), and Pthr being a constant selected by analyzing the polars of the propulsive propellers (6).

11. A method according to claim 1, wherein the direct mode is engaged when the thrust variation control order Tcl is obtained by using a pulse control having three states −1, 0, +1, i.e. the function Beep(Tcl), by actuating the +1 or the −1 state.

12. A method according to claim 1, wherein the regulated mode is engaged when P>Pthr at the same time as an absence of any thrust variation control order Tcl, by activating the 0 state of the pulse control having three states −1, 0, +1, where P with the current power at the propeller(s) (6) and Pthr is a constant selected by analyzing the polars of the propulsive propellers (6).

13. A method according to claim 1, wherein, in the protected mode, it consists in using at least one loop for monitoring a limiting physical parameter, in verifying whether the limit associated with said parameter has been reached or exceeded, and if so in maintaining activation of protected mode.

14. A method according to claim 13, consisting in selecting, in the following priority order 1 to 5, the limiting physical parameter for which the corresponding limit is reached or exceeded and for which the monitoring loop is activated, i.e.:
  1) the speed of rotation Ω of the propeller(s) (6);
  2) the engine power Pmd available for the propellers (6);
  3) the transmission torque Trq;
  4) the current dive deflection margin DDM of the longitudinal cyclic control expressed as a percentage of its total deflection amplitude; and
  5) the indicated air speed IAS.

15. A method according to claim 13, wherein, in the protected mode, it consists in using at least one flight parameter relating to the available power margin AP or to the available torque margin ΔTrq in order to peak-limit or diminish the control order if ΔP<0 or if ΔTrq<0, thereby determining a mean pitch setpoint βtcl* that is compatible with the propeller(s) taking power that does not exceed the available power margin, the +1 state of the pulse control also being inhibited.

16. A method according to claim 15, consisting in using a peak-limiting term given by:

$$\frac{\partial \beta}{\partial P} \times \Delta P \text{ if } \Delta P < 0 \text{ or } \frac{\partial \beta}{\partial Trq} \times \Delta Trq \text{ if } \Delta Trq < 0.$$

17. A method according to claim 13, wherein, in the protected mode, it consists in using at least one flight parameter relating: to the speed of rotation margin ΔΩ available for the rotor(s) of the propellers(s) (6); to the available indicated air speed margin ΔIAS; or to the current dive deflection margin of the longitudinal cyclic control expressed as a percentage of its total deflection amplitude, i.e. ΔDDM=DDM−10%; in order to apply a proportional/integral correction PI to said parameter, and if ΔΩ<−0.6 rad/s, or if ΔIAS<0, or if ΔDDM<0, then the control order is decremented by the result of the proportional/integral correction PI in order to determine a mean pitch setpoint βtcl* compatible with power being taken by the propeller(s) (6) without exceeding the available power margin, the +1 state of the pulse control then being inhibited.

18. A method according to claim 17, wherein:
  if the longitudinal cyclic control margin DDM is less than 10%, then the mean pitch setpoint βtcl* is decremented by the value:
    (DDM−10)×PPgradddm+PPiddm×∫(DDM−10%)dt
  where PPgradddm and PPiddm are constants;
  if the indicated air speed IAS is greater than the velocity never exceeded VNE, then the mean pitch setpoint βtcl* is decremented by the value:
    (IAS−VNE)×PPgradias+PPias×∫(IAS−VNE)dt
  where PPgradias and PPias are constants; and
  if the value of Ω−Ω* is less than −0.6 rad/s, then the mean pitch setpoint βtcl* is decremented by the value:
    PPgradΩ×(Ω−Ω*)+PPiΩ×∫(Ω−Ω*)dt
  where PPgradΩ and PPiΩ are constants.

19. A method according to claim 1, wherein the power consumed by the propeller(s) (6) is estimated by a specific algorithm, as a function of the pitches β1, α2 of the propellers, of the true air speed TAS, of the speed of rotation Ω of the propellers (6), and of the air density σ.

20. A method according to claim 1, wherein the power consumed by the propeller(s) (6) is estimated by a specific algorithm as a function of the pitches β1, β2 of the propellers (6), of the true air speed TAS, of the setpoint speed of rotation Ω* for the propellers (6), and of the density of the air σ.

21. A method according to claim 1, wherein the power consumed by one or more propellers (6) is measured by sensors such as torque meters on the transmission of the propellers (6).

22. A control and regulation system for a rotorcraft having at least one main lift rotor, at least one variable-pitch propulsive propeller (6), and at least one power source for driving the main rotor(s) and the propeller(s) (6), wherein the system comprises means for implementing the method according to claim 1.

23. A control and regulation system according to claim 22, comprising both an emergency mechanical channel or chain for controlling the pitch of the propulsive propeller(s) (6) in direct mode, and an electrical channel or chain for controlling the pitch of the propulsive propeller(s) (6), said electrical channel or chain including means for complying with limits.

24. A control and regulation system according to claim 23, wherein the mechanical channel or chain comprises:
  a Tcl lever (60) for controlling the mean pitch βtcl;
  a rudder bar (67) for controlling the differential pitch βd;
  a rudder bar damper (68);
  a variable ratio crank (63) of variation that is a function of the position of the Tcl lever (60) in order to reduce the authority of the rudder bar (67) as a function of thrust;
  a combiner/coupler (66) for summing and subtracting the mean pitch βtcl and the differential pitch βd; and
  a system of links, cables, and pulleys.

25. A control and regulation system according to claim 23, wherein the electrical channel or chain comprises:
  a Tcl beep associated with the collective pitch lever (70);
  a first series actuator (61) for controlling the mean pitch βtcl of the left propeller (6);
  a second series actuator (62) for controlling the mean pitch βtcl of the right propeller (6);
  a first trim actuator (65) for the Tcl lever (60);
  a second trim actuator (69) for the rudder bar (67);
  a computer (64) receiving information from the flight control system FCS and establishing control relationships for the pitch of the propellers (6);
  means for measuring the positions of the pilot controls engaged with the Tcl lever (60) and the rudder bar (67);
  electrical connections; and
  means for measuring the positions of the series actuators (61, 62).

26. A program for controlling a rotorcraft to implement the method in accordance with claim 1, wherein the program comprises code stored on a non-transitory medium, the code being readable and/or executable by at least one data processor unit in order to control and/or regulate the pitch setting of at least one propulsive propeller, the code including respective code segments for implementing characteristic operations or steps of said control and regulation method.

27. An aircraft of the rotorcraft kind, including a control and regulation system according to claim 22.

* * * * *